United States Patent [19]

Denny

[11] 4,025,679

[45] May 24, 1977

[54] FIBRILLATED POLYTETRAFLUOROETHYLENE WOVEN FILTER FABRIC

[75] Inventor: Thomas E. Denny, Newark, Del.

[73] Assignee: W. L. Gore & Associates, Inc., Newark, Del.

[22] Filed: Aug. 6, 1976

[21] Appl. No.: 712,166

[52] U.S. Cl. .................................... 428/91; 26/51; 28/72.16; 28/72.17; 28/DIG. 1; 55/527; 55/528; 55/DIG. 16; 210/507; 210/508; 428/229; 428/245; 428/260; 428/265; 428/422; 26/71; 26/72
[51] Int. Cl.² .................. B01D 39/04; B01D 39/16
[58] Field of Search ............ 428/91, 229, 245, 260, 428/265, 422; 210/500 R, 503, 505, 507, 508; 26/29 R, 51, 54 R, 54 B; 28/72 R, 72 HR, 72.16, 72.17, DIG. 1; 55/74, 97, 527, 528, DIG. 16

[56] References Cited

UNITED STATES PATENTS 2,578,523  12/1951  Llewellyn .............................. 18/55
3,542,632  11/1970  Eickhoff .............................. 428/95

*Primary Examiner*—Marion E. McCamish
*Attorney, Agent, or Firm*—E. A. Uebler; J. S. Campbell

[57] ABSTRACT

The product of the present invention is a fabric woven from oriented polytetrafluoroethylene (PTFE) strands, in which the strands of the weave are interconnected by a multiplicity of fine PTFE fibrils. To produce this fabric, consisting entirely of PTFE, a woven PTFE fabric is heated substantially unrestrained to a temperature above the crystalline melt point of PTFE and stretched. Alternatively, a woven PTFE fabric may be impregnated with other fluorocarbon polymers, heated substantially unrestrained to a temperature above the crystalline melt point of PTFE, and subsequently stretched, thereby generating a multiplicity of fine fibrils interconnecting the weave.

20 Claims, 6 Drawing Figures 4,025,679

FIBRILLATED POLYTETRAFLUOROETHYLENE WOVEN FILTER FABRIC

FIELD OF THE INVENTION

In the filtration of polutants from hot gases, synthetic fibers woven into fabric filters are used extensively. Many industries require such treatment of hot gases and only the economically attractive filter efficiencies offered by fabric collectors will be capable of satisfying both public and government pressure at an acceptable cost.

There are two methods generally employed in the filtration of hot gases. They are:

a. Cool the gases to a temperature most filter media can withstand; and b. Increase the temperature capabilities of the filter medium.

Method (b) is much the more attractive from both an economic and practical viewpoint. Operation of a dust filtration apparatus at high temperatures (90° C up) offers significant advantages in improved capacity, lower product cost and freedom from condensation. In order to cool industrial gases below 150°, tempering air is required, resulting in an increase in the volume of air to be moved and thus increasing the power requirements. This increase in volume of air also increases the risk of condensation. Condensation on filter fabrics is among the principal causes of fabric filter failure. Wetting of the dust on and within the fabric causes the medium to blind, resulting in increased pressure drop and reduced throughput.

Acid forming gases, e.g. $SO_3$, can form condensates which cause corrosion problems to the system in general and the fabric in particular. However, if the operating temperature of the filtering process is maintained above 140° C, condensation can be essentially eliminated.

Many of the problems outlined above can be overcome by utilizing fluorocarbon polymers possession high thermal resistance and chemical inertness. Polytetrafluoroethylene (hereinafter "PTFE") filters are presently commercially available in two forms, woven fabrics and needle felts.

The woven fabric serves as a base upon which a cake of filtrate accumulates. Initial filtering efficiencies are low until a sufficiently dense cake is formed. Efficiency herein is defined as the weight of contaminant retained by the filter, under controlled conditions, divided by the weight of contaminant introduced, expressed as a percent. The flow path is relatively straight, through the interstices of the weave, and cake build-up is relied upon to trap dust particles. Excess dust is removed periodically from the fabric by mechanical shaking or reverse air cleaning.

Needle felts are formed from short individual fibers which are mechanically bonded to a woven scrim cloth by a needling process. Using this medium, particle entrapment is achieved primarily due to the impingement of the dust on the filters. The flow path is tortuous and cleaning or removal of the dust is usually accomplished by reverse airflow.

BRIEF DESCRIPTION OF THE INVENTION

An objective of this invention is the provision of an efficient filter medium suitable for use at high temperatures, or in aggressive chemical environments. The medium comprises a fabric of woven, highly oriented, PTFE strands in which adjacent strands are interconnected by a multiplicity of fine fibrils of a fluorocarbon polymer. These fine fibrils are formed in all three dimensions providing an extremely tortuous pathway for any particle attempting to traverse the fabric.

A further objective of this invention is to provide a process for the manufacture of a woven PTFE fabric having a multiplicity of fine fluorocarbon fibrils interconnecting adjacent strands of the weave.

DETAILED DESCRIPTION OF THE INVENTION

Figure 1:
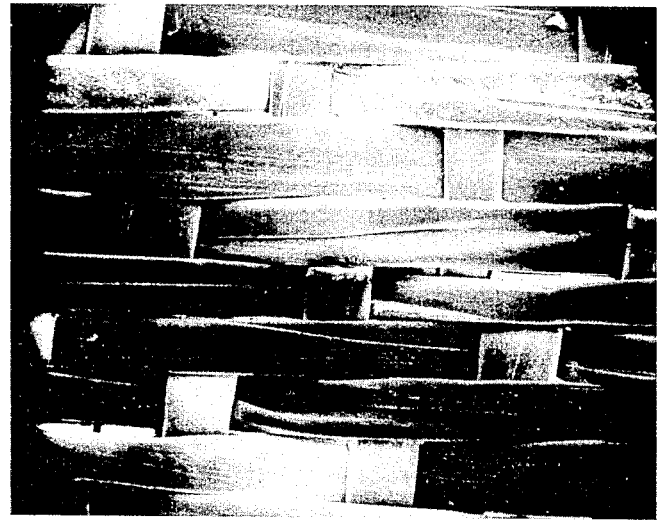

FIG. 1 is a photomicrograph taken at 100 × magnification, showing a typical woven fabric of PTFE. The strands making up the weave can be manufactured from fibers or filaments produced by any of the methods known to one skilled in the art. In U.S. Pat. Nos. 3,953,566 and 3,962,153, highly oriented filaments are produced by highly elongating PTFE articles of appropriate cross-section. The filaments thus produced are extremely useful in the present invention because of the highly anisotropic tensile strengths produced by the orientation processes.

Another method for manufacturing PTFE strands suitable for use in the present invention is disclosed in U.S. Pat. No. 2,776,465.

The first stage in the two stage process used to manufacture the product of this invention is a heat shrinking step carried out at a temperature above the crystalline melt point of PTFE. A woven PTFE fabric is heated, in the absence of any substantial restraining forces, to a temperature above the crystalline melt pont of PTFE, and maintained at that temperature for a period of time. The crystalline melt point of PTFE generally ranges from about 327°–352° C. In the heat shrinking step of this invention, the temperature of the fabric must exceed the crystalline melt point of PTFE. As shown in the examples which follow, the higher this temperature the shorter is the required heating time and conversely. Care must be taken not to heat the PTFE fabric to a temperature at which polymer degradation can occur at an appreciable rate. The preferred temperature range is from about 365° C to about 430° C. During heating in the absence of substantial restraining forces, the fabric retracts or shrinks to between 25%–75% of the original dimensions of the fabric prior to heating.

Highly oriented PTFE retracts strongly in the direction of orientation at temperatures above the crystalline melt point, and fabrics woven of highly oriented PTFE filaments retract and become essentially impermeable when heated above this temperature.

Following heating and retraction, the fabric is stretched in one or more directions at a temperature in excess of 300° C to 125%–400% of its dimensions in the shrunken state. A multiplicity of fine fibrils of PTFE are formed during this stretching which interconnect adjacent strands in the woven fabric.

Figure 2:
Figure 3:

The surface of the fabric after such processing is shown in FIG. 2, taken at 100 × magnification. A multiplicity of fine PTFE fibrils at right angles to and also parallel to the woven fabric strands are clearly visible. These fine fibrils are of two basic forms: (a) the fine fibrils are anchored at opposite ends in different strands of the weave; and (2) the fine fibrils originate and terminate in the same strand. These fine fibrils have lengths ranging from about 5 to 300 microns and diameters from about 0.25–3 microns. FIG. 3 is an area from FIG. 2 shown at a higher magnification (200×)

and shows that an opening in the top plane of the fabric surface is blocked by the fibrils formed in the plane beneath.

Figure 4:
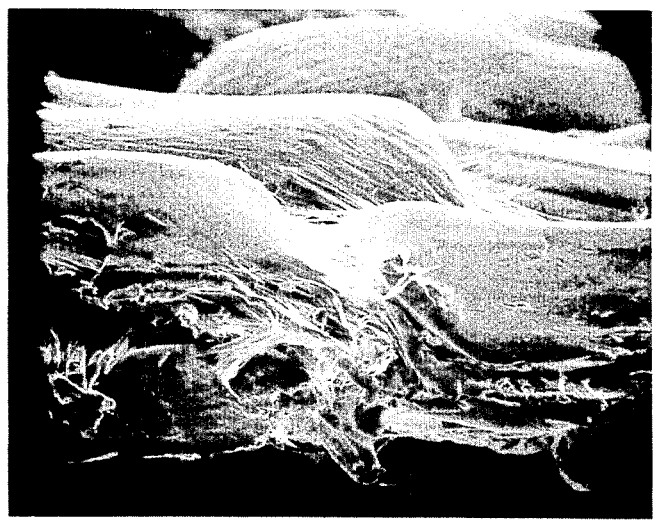
Figure 5:
Figure 6:
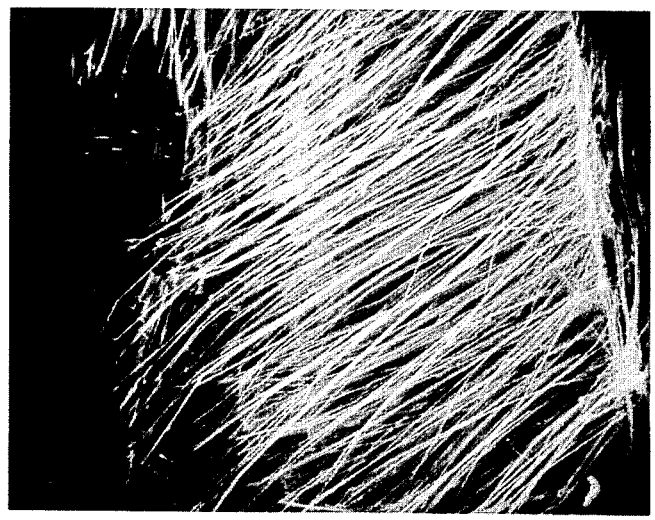

FIG. 4 is an end elevation of a section through the fabric taken at 100 × magnification. This figure emphasizes the three dimensional nature of the fine fibril production. Thus, a maze-like passageway is encountered by any particle seeking a pathway through the fabric. FIG. 5 taken at 100 × shows the reverse surface of the same fabric showing that the contours and fibril density are substantially the same on both surfaces. FIG. 6 is a higher magnification (500×) of the fine fibrils interconnecting the fabric strands across the interstices of the weave.

It is an altogether surprising development that fine fibrils can be produced interconnecting the strands of a woven PTFE fabric by stretching the fabric after heat-shrinking the fabric at a temperature above the crystalline melt point of this polymer.

Although the product of this invention has been described as it relates to industrial filter media, the use of the product is not intended to be constrained or limited to this field. One skilled in the art will readily see that the structure produced has many uses. By way of illustration, and in no way limiting the scope of this invention, the product may be used to separate wetting and non-wetting fluids, in gas-liquid separations and to meter fluid flow.

A fabric which has first been dipped in a dispersion of PTFE or of a co-polymer of tetrafluoroethylene and hexafluoropropylene (F.E.P.) can also be processed as set forth above to produce the fine fluorocarbon fibrils of this invention, interconnecting the fabric strands.

A fabric produced according to the process of this invention is useful by itself as a finished product or the fabric can be laminated to other sheets, or it can be impregnated and bonded with other materials to provide composite structures having novel and unique properties.

The material of this invention can be bonded to other materials and to itself much more readily than conventional PTFE woven fabric. This is due to bonding agents being able to penetrate a significant distance into the fine fibril network and after setting, being trapped in place.

The invention will be further understood by reference to the examples given below, all of which are given for illustrative purposes only and are not limitative.

EXAMPLE I

An apparatus was constructed in which a woven PTFE fabric could be placed and allowed to retract substantially unrestrained to a percentage of its original dimensions and then be subsequently stretched.

The permeability of the products produced as described below was measured in terms of Frazier Number. Frazier Number is defined herein as the flow rate of air through the fabric in cubic feet per minute per square foot of fabric area under a pressure drop of 0.5″ H$_2$O (A.S.T.M. D737–46).

Filaments of PTFE were manufactured according to the teachings of U.S. Pat. No. 3,953,566. These filaments with 0° twist/in. in the warp direction and 3.2° twist/in. in the fill direction were woven into a four harness satin on commercial machinery.

The woven PTFE fabric was fixed on the apparatus described above and the apparatus placed in an oven at 425° C and the fabric was allowed to shrink. The shrunken fabric was then taken out of the oven and stretched. Results are shown in Table 1. The term degraded means that the sample was a failure and it no longer had structural integrity.

TABLE I

| Sample | Time In Oven | Permeability | Original Diameter | Shrunk Diameter | Stretched Diameter |
|---|---|---|---|---|---|
| 1 | 5 mins. | Degraded | 20″ | 10″ | 15″ |
| 2 | 4.5 mins. | 5.2 | 20″ | 10″ | 15″ |
| 3 | 4 mins. | 3.5 | 20″ | 10″ | 15″ |

Samples 2 and 3 possessed fine PTFE fibrils between the strands interconnecting the weave as shown in FIG. 2. Sample 1, although having areas with such fibril formation, had been exposed to high temperatures for too great a time and exhibited severe degradation.

EXAMPLE II

Six different weaves of PTFE fabric, woven from the filaments described in Example 1 were evaluated. The processing conditions were as follows: at an oven temperature of 425° C, each sample was allowed to retract to 25% of its initial unstretched dimensions and then stretched to 150% of its shrunken dimensions. The results of these tests are shown in Table II.

TABLE II

| Weave Type | Sample Number | Time In Oven | Permeability (Frazier Number) |
|---|---|---|---|
| 4 harness crows foot Satin | 1 | 6 mins. | 7.5 |
| 4 harness crows foot Satin | 2 | 6 mins. | 7.3 |
| 2 × 2 twill | 1 | 5 mins. | Degraded |
| 2 × 2 twill | 2 | 4 mins. | 1.7 |
| 1 × 1 simple weave | 1 | 4.5 mins. | 6.7 |
| 1 × 1 simple weave | 2 | 3.5 mins. | 0.5 |
| 8 Harness Satin | 1 | 6 mins. | Degraded |
| 8 Harness Satin | 2 | 4.5 mins. | 21 |
| 8 Harness Satin | 3 | 2.3 mins. | 6.8 |
| 2 × 2 Basket | 1 | 4.5 mins. | Degraded |
| 2 × 2 Basket | 2 | 3.5 mins. | 4.5 |

All samples for which a permeability value is shown had interconnecting fine PTFE fibrils between the strands of the fabric and also possessed structural integrity.

EXAMPLE III

This example was performed as in Example I, except that in this case the fabric was woven with 400 denier filament in the warp direction and a 1200 denier filament replacing a 400 denier filament every fourth strand in the fill direction. The processing conditions were: oven temperature 425° C, fabric shrunk to 25% of its original area and stretched to 200% of its shrunken area.

TABLE III

| Time In Oven | Permeability (Frazier Number) |
|---|---|
| 4.5 mins. | 4.5 |
| 5 mins. | 11.8 |
| 5.5 mins. | 10.4 |

All material exhibited the characteristic fibril formation and possessed structural integrity. Fibril formation between the 1200 and 400 denier filaments was comparable to fibril formation between the filaments of the same denier.

EXAMPLE IV

Samples were prepared similar to those in Example III, except that the percent stretch was varied. Results are shown in Table IV.

TABLE IV

| Sample | Time in Oven | Permeability | % Stretch |
|--------|--------------|--------------|-----------|
| 1 | 115 secs. | 9.8 | 66% |
| 2 | 115 secs. | 7.6 | 50% |

The fibrils formed in the 50% stretch were shorter and were more numerous per unit area than those in the 66% stretched sample.

EXAMPLE V

A 4 harness satin weave was processed at various temperatures, allowed to shrink 25% of its original area and stretched 200% of its shrunken area. Results are shown in Table V.

TABLE V

| Sample Number | Temperature | Time | Permeability |
|---------------|-------------|------|--------------|
| 1 | 370° C | 5 mins. | High, limited Fibril Formation |
| 2 | 370° C | 12 mins. | High, limited Fibril Formation |
| 3 | 370° C | 20 mins. | High, limited Fibril Formation |
| 4 | 385° C | 2 mins. 15 secs. | High, limited Fibril Formation |
| 5 | 385° C | 3 mins. 30 secs. | 10.3 |
| 6 | 385° C | 4 mins. 30 secs. | 7.0 |
| 7 | 385° C | 5 mins. | High, degraded |
| 8 | 400° C | 3 mins. | High, limited Fibril Formation |
| 9 | 400° C | 4 mins. 0 secs. | 7.0 |
| 10 | 400° C | 4 mins. 5 secs. | 6.5 |

As can be seen, the effect of time at temperature is very important in obtaining a useful product.

EXAMPLE VI

An 8 harness satin PTFE fabric woven from 400 denier filament was first dipped in a 38% by weight dispersion of fluoronated ethylene-propylene (F.E.P. type 120) (manufactured by E. I. DuPont deNemours & Co., Inc.) and then processed as in Example I. Results are shown in Table VI.

TABLE VI

| Sample | Time In Oven | Permeability (Frazier Number) |
|--------|--------------|-------------------------------|
| 1 | 2 mins. 30 secs. | 13.5 |
| 2 | 2 mins. 30 secs. | 10.3 |

The material of this example had 17 grms/sq. yd. of F.E.P. deposited on the fabric resulting in an excellent substrate for bonding of other materials. The samples all had interconnecting fine fluorocarbon polymer fibrils between the strands of the fabric and also possessed structural integrity.

EXAMPLE VII

An apparatus was devised for continuously producing the PTFE fabric of this invention. The apparatus was a 6' long 36" wide oven with a loading apparatus at one end that placed woven fabric on a conveyor. Material was fed through feed rolls and then to pins located on the conveyor which impaled the fabric at its edges. Material was fed at twice the speed of the conveyor, allowing 2:1 shrinkage in the machine direction. The material was 27" wide as fed to the conveyor, and the edge pins, located on chains running with the conveyor, permitted the incoming fabric to shrink to about a 11" width. The apparatus thus permitted the woven sheet to shrink to about 25% of its original area upon heating.

The oven was divided into four, equal, individually recorded temperature zones.

| | Length | Average Temperature |
|---|--------|---------------------|
| First Zone (entering) | 25% of oven | 376° C |
| Second Zone | 25% of oven | 385° C |
| Third Zone | 25% of oven | 414° C |
| Fourth Zone | 25% of oven | 422° C |

Material time in oven — 3 mins. 23 secs.

Upon leaving the oven, the shrunken sheeting was stretched biaxially to dimensions such that the final longitudinal dimension was 1.8 times the shrunken longitudinal dimension and the final width was 1.5 times the shrunken width.

The Frazier Number of the material so produced was 7.5–9.0; and the material possessed fine fibrils interconnecting the woven fabric strands integrity.

While my invention herein has been disclosed, using specific embodiments and examples, these are intended to be illustrative only and not limitative, and changes, modifications or equivalents can be used by those skilled in the art. Such changes within the principles of my invention are intended to be within the scope of the claims below.

I claim:

1. A fabric woven from strands of polytetrafluoroethylene in which said fabric possesses a multiplicity of fine fibrils of a fluorocarbon polymer interconnecting said strands, which fibrils are separated from each other by void spaces and are anchored at their opposite ends in said strands of said fabric.

2. The fabric of claim 1 in which said fine fibrils are anchored at their opposite ends in different strands of said fabric.

3. The fabric of claim 1 in which said fine fibrils are anchored at their opposite ends in the same strand of said fabric.

4. The fabric of claim 1 in which said fine fibrils are composed of polytetrafluoroethylene.

5. The fabric of claim 1 in which said fine fibrils have lengths of about 5 micron to about 300 microns.

6. The fabric of claim 1 in which said fine fibrils have diameters of about 0.25 - 3 microns.

7. A process for the manufacture of a fabric woven from strands of polytetrafluoroethylene and having a multiplicity of fine fibrils of polytetrafluoroethylene polymer interconnecting said strands of said fabric which comprises:
   a. heating a woven fabric of polytetrafluoroethylene strands to a temperature above the crystalline melt point of polytetrafluoroethylene in the absence of substantial restraining forces, thereby allowing said fabric to shrink, followed by
   b. stretching said shrunken fabric in one or more directions thereby forming said fine fibrils in the interstices between said woven strands.

8. The process of claim 7 wherein said heating is at a temperature above 365° C.

9. The process of claim 7 wherein said heating is at a temperature of about 385° C.

10. The process of claim 7 wherein said heating is at a temperature of about 400° C.

11. The process of claim 7 wherein said heating is at a temperature of about 410° C.

12. The process of claim 7 wherein said heating is at a temperature of about 425° C.

13. The process of claim 7 wherein the dimensions of the shrunken fabric are about 25% of the original dimensions of the fabric.

14. The process of claim 7 wherein the dimensions of the shrunken fabric are about 50% of the original dimensions of the fabric.

15. The process of claim 7 wherein the dimensions of the shrunken fabric are about 75% of the original dimensions of the fabric.

16. The process of claim 7 wherein said stretching increases the dimensions of the fabric to more than 1.25 times the dimensions of the fabric in the shrunken state.

17. The process of claim 7 wherein the stretching increases the dimensions of the fabric to about 1.50 times the dimensions of the fabric in the shrunken state.

18. The process of claim 7 wherein the stretching increases the dimensions of the fabric to about 2.00 times the dimensions of the fabric in the shrunken state.

19. The process of claim 7 wherein the stretching increases the dimensions of the fabric to about 3 times the dimensions of the fabric in the shrunken state.

20. The process of claim 7 wherein the stretching increases the dimensions of the fabric to about 4 times the dimensions of the fabric in the shrunken state.

* * * * *